Jan. 1, 1929.

J. E. SHERMAN

HEADLIGHT

Filed July 21, 1925

Inventor
James E. Sherman
by Popp & Powers
Attys.

Jan. 1, 1929.  1,696,978
J. E. SHERMAN
HEADLIGHT
Filed July 21, 1925   3 Sheets-Sheet 2
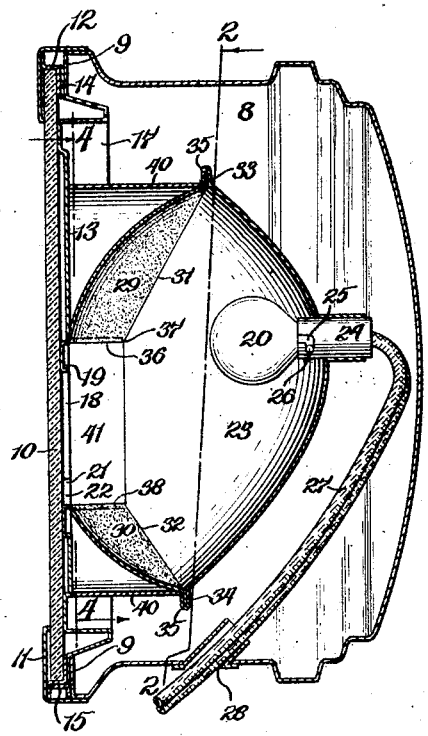
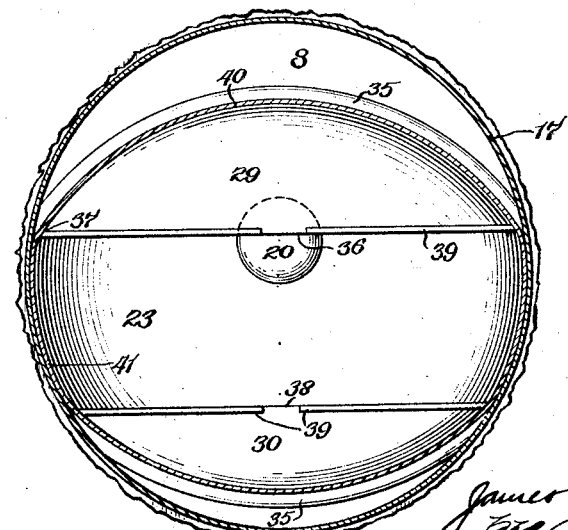

Jan. 1, 1929.  
J. E. SHERMAN  
1,696,978  
HEADLIGHT  
Filed July 21, 1925   3 Sheets-Sheet 3
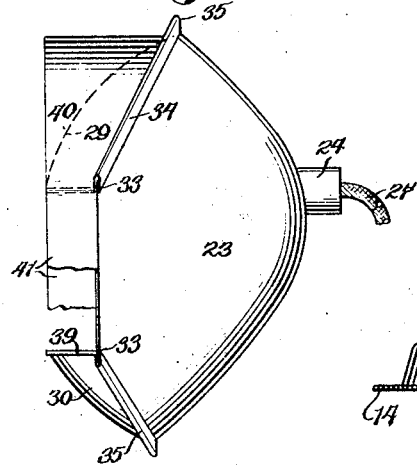
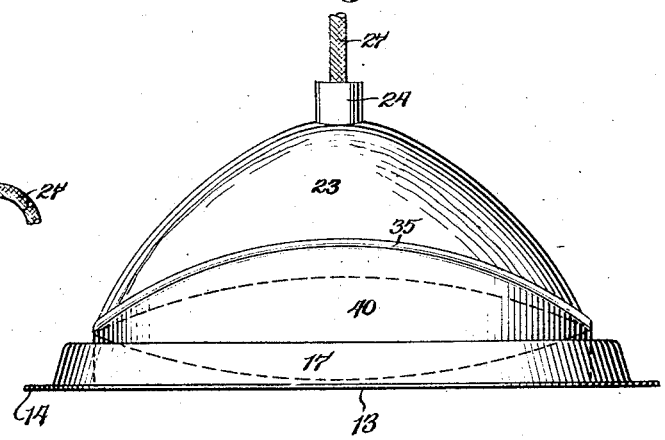
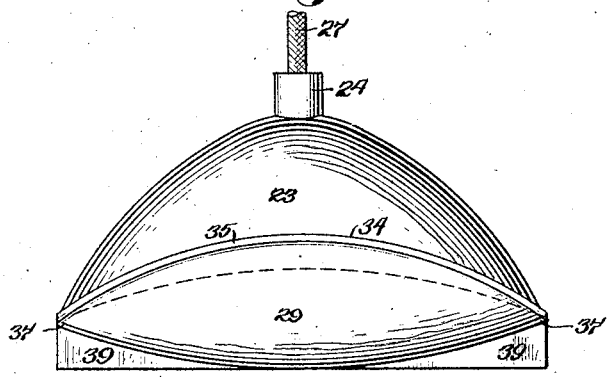

Patented Jan. 1, 1929.

1,696,978

UNITED STATES PATENT OFFICE.

JAMES E. SHERMAN, OF BUFFALO, NEW YORK.

HEADLIGHT.

Application filed July 21, 1925. Serial No. 45,005.

This invention relates to a light-projector and more particularly to a light-projector adapted to be used in the head lights of automobiles or other vehicles and has for its principal object the provision of a projector in which the glaring or intense light is directed to the roadway and prevented from rising above a certain horizontal plane or level and disconcerting pedestrians or the drivers of approaching vehicles.

Another object is to provide such a projector in which there is a minimum loss of light flux and which will direct a full beam of light a sufficient distance ahead of the car to adequately illuminate approaching objects and to comply with all traffic laws relating thereto.

A further object is to provide a projector which will adequately illuminate the roadway immediately in front and to either side of the automobile on which it is mounted.

A still further object is the provision of such a projector which is simple, durable, inexpensive and can be readily applied to headlight casings now in common use without altering the construction of the said casing.

In the accompanying drawings:—

Figure 3 is a longitudinal sectional elevation taken on line 3—3, Figure 1.

Figure 4 is a transverse section taken on line 4—4, Figure 3 looking in the direction of the arrows associated therewith.

Figure 5 is a side elevation of the projector with the shield removed and showing the lower part of the supporting rim broken away.

Figure 6 is a top plan view of the projector.

Figure 7 is a top plan view of the projector with the shield and supporting rim removed.

Similar characters of reference indicate like parts throughout the several views.

Figure 1:
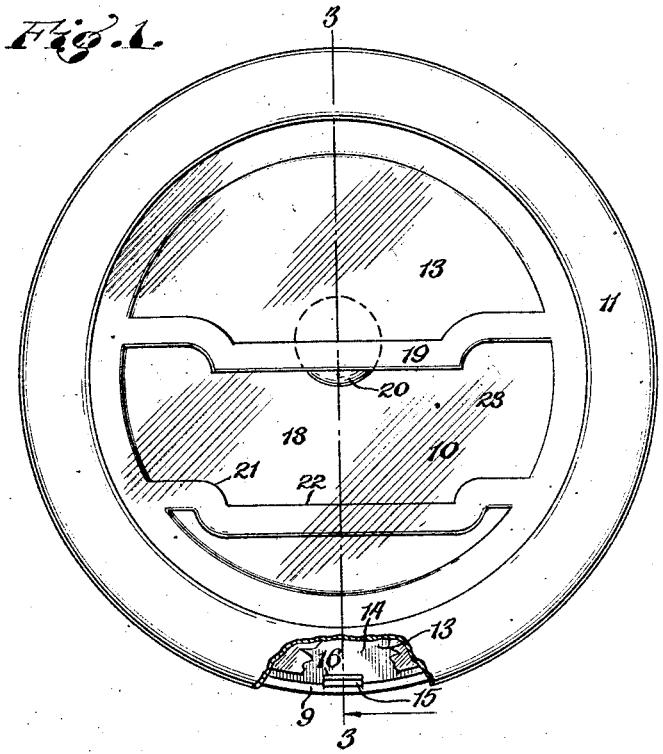
Figure 1 is a front elevation of a headlight equipped with my invention showing part of the rim broken away.
Figure 2:
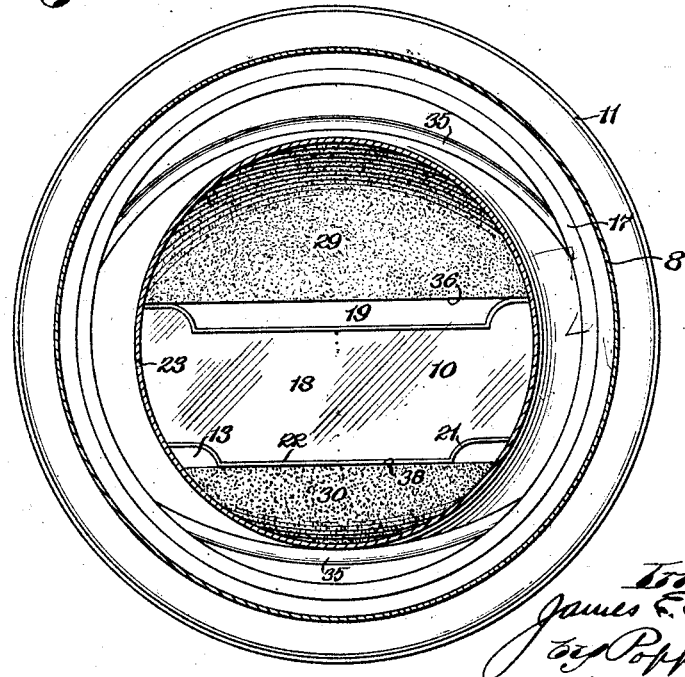
Figure 2 is a transverse sectional elevation of the same, the section being taken on line 2—2, Figure 3.

In its general organization this projector comprises a parabolic reflector adapted to be arranged in the casing of a headlight, a vertical shield arranged in front of said reflector adjacent the lens of the headlight and having a horizontal opening through which the light is directed to the roadway and upper and lower transverse reflectors opposing the main reflector, which opposed reflectors are made in the form of a segment of a paraboloid and connect the main reflector and the shield, the upper reflector being larger than the lower reflector.

The projector is adapted to be applied to any headlight casing of standard shape, the casing 8 shown in the drawings being of the well known "barrel" or cylindrical shape and having an inwardly projecting annular flange 9 at its mouth or opening which forms the rear support for the lens 10. The lens is held against this flange by a retaining ring 11 which extends rearwardly and removably engages the headlight casing in any well known and approved manner. To cushion the lens and reduce the danger of breaking the same it is set in the usual ring 12 of copper or other soft metal which forms a rim for the same.

The projector is supported from a shield or plate 13 which is preferably made of sheet metal such as copper or gun metal and is arranged within the casing adjacent the lens thereof. This shield is firmly held at its peripheral or marginal part 14 between the lens and the adjacent flange 9 of the casing and as shown in Figures 1 and 3 is prevented from turning relatively to the casing by a lug or finger 15 soldered or otherwise suitably provided on the casing which engages a corresponding recess 16 on the periphery of the shield and maintains the same in alignment. The shield is provided adjacent its periphery with an annular rearwardly extending rim or flange 17 formed integrally and concentric therewith which is U-shaped in cross section and serves to stiffen the shield and to more reliably support the reflecting members mounted on said shield. The opening 18 in the shield through which the light is directed to the roadway and to either side of the road immediately in front of the car is arranged below the center of the shield and extends horizontally from one side of the shield to the other. As best shown in Figure 1, the shield is provided on the upper edge of the opening 18 with a depending lip 19 which extends centrally into the opening 18 below the center of the bulb 20 thereby preventing the direct rays of the bulb from extending upwardly and producing a glaring effect. The direct light from the bulb 20 on either side of the depending lip 19 illuminates the objects along the side of the road immediately in front of the car, thereby increasing the safety and comfort of driving. To obtain a uniform beam of light ahead of the car the lower edge or side 21 of the opening 18 conforms to the shape of the upper edge and has for this purpose a recess 22 corresponding to the depending lip 19 at the top of the opening. Since the upper and lower sides of the opening are substantially parallel a beam of light of uniform depth is projected from the headlight and a uniform illumination of the road is obtained.

The forwardly facing or main reflector 23 is arranged in the center of the casing and is of the usual parabolic shape having its major or longitudinal axis arranged horizontally so that a concentrated beam of light is directed forwardly. The electric bulb 20 forming the illuminating means may be secured within the reflector in any suitable manner, the means shown comprising a socket 24 secured to the reflector and having a bayonet slot 25 which is engaged by a transverse pin 26 provided on the shank of the bulb ensuring a reliable electrical contact. The wires 27 leading to the socket are arranged behind the reflector 23 and are introduced into the casing through a suitable opening 28 in the bottom thereof. The bulb 20 is so mounted that its filament is not arranged on the major axis of the reflector but slightly above this axis as best shown in Figure 3. By so mounting the bulb above the axis of the reflector (within one half of an inch of the same in the usual automobile headlight reflector) it has been found that the rays of light are directed downwardly without, however, diminishing to any great degree the effective distance of the beam directed ahead of the car by the reflector.

In order to reflect part of the light directed above and below the opening 18 in the shield, and thus increase the intensity of the distance beam and also the less intense light immediately in front of the car, upper and lower curved reflectors 29 and 30 are provided, each of which has the form of a segment of a paraboloid (i. e. a section formed by two intersecting planes) and extend forwardly from the upper and lower sides of the peripheral edge of said forwardly facing reflector and reflect the light toward the said reflector. These rearwardly facing or opposed reflectors are preferably not so highly reflective as the main or forwardly facing reflector and for this purpose are made of or coated with a metal or finish of a dark color such as gun metal or black nickel. A dark lacquer may also be applied to the reflecting surfaces of these reflectors though such a finish has not been found so satisfactory as a metallic finish. By providing rearwardly facing reflectors finished in such a manner the power of the headlight is materially increased without causing an objectionable glare above the level of the headlight beam since the light which is subject to the cross reflection is of a subdued character. Moreover by making the opposed or rearwardly facing reflectors of parabolic form an even cast of the same color as the finish of the opposed reflectors is reflected on the main reflector without the formation of an objectionable image thereon.

Each of the opposed or rearwardly facing reflectors 29 and 30 is secured at its rear edge to the peripheral edge of the main reflector and for this purpose the upper and lower parts 31 and 32 respectively of the peripheral edge of the main reflector are inclined and converge forwardly, and are provided with outwardly extending flanges 33. Each of the opposed reflectors is provided at its rear edge with a corresponding outwardly extending flange 34 which is reversely formed or of U-shape in cross section and adapted to receive the corresponding peripheral flange of the main reflector. After the several sections of the reflector have been assembled the sides of the U-shaped flanges of the opposed or rearwardly facing reflectors are pressed together and securely clamp the flanges of the forwardly facing reflector therebetween, forming a peripheral bead 35 extending around the upper and lower inclined edges of the forwardly facing reflector.

The lower edge 36 of the upper rearwardly facing reflector 29 engages the rear side of the shield 13 adjacent the upper side of the opening and extends horizontally rearwardly, terminating at the outer pointed ends 37 of the opposed reflector adjacent the forwardly facing reflector. In a similar manner the upper edge 38 of the lower reflector is horizontally disposed and extends rearwardly from the opening in the shield to the forwardly facing reflector. In order to fill the intervening space between the shield and the horizontal edges of each of the opposed reflectors and thereby add to the appearance and rigidity of the projector, a plurality of horizontal filler pieces or shelves 39 are provided which are secured by soldering or otherwise to the rearwardly facing reflectors adjacent their horizontal or opposing edges 36 and 38 and extend forwardly and are secured in a similar manner to the rear side or face of the shield 13. Each of these shelves is, of course, relatively narrow at its inner side near the point where the shield and reflector contact, and increase in width as the edge of the reflector recedes from the shield.

The projector is supported from the shield 13 by a longitudinally arranged circumscribing flange or rim 40 which is secured at its front end to the rear face of the shield in any suitable manner, and engages the periphery of the projector at its rear end, as best shown in Figures 5 and 6. This supporting flange is oval shaped in cross section and is adapted to engage the upper and lower opposed reflectors 29 and 30 immediately in front of the bead 35 formed by the connecting flanges of the reflector sections and also engages the outer edges of the horizontal filler pieces or shelves 39 and forms the side walls 41 of the projector intermediate these shelves, thereby completely enclosing the projector except for the opening through which the light is projected forwardly. By supporting the reflector sections in this manner the same are maintained in proper relation to the shield and are not liable to become loose due to the constant vibrations and jars to which the projector is subjected. Moreover the projector may be inserted as a unit in headlight casings of standard construction without requiring the use of any special tools or skill.

The projector effectively eliminates the objectionable glare of the headlight above the horizontal plane of the same, and at the same time is adapted to direct a powerful and full beam of light a sufficient distance ahead of the car to illuminate distant objects and thereby increase the safety and comfort of driving the vehicle.

The projector is also of very simple compact and durable construction and is of pleasing appearance making it a desirable adjunct to the automobile.

I claim as my invention:—

1. In a light projector adapted to be arranged in a headlight casing, a shield arranged in the opening of said casing, a forwardly facing reflector arranged in said casing, illuminating means arranged intermediate said reflector and shield, said shield having a horizontal opening through which the light is directed forwardly, a central lip formed integrally with said shield and depending from the upper edge of said horizontal opening so as to project below said illuminating means, the lower edge of said horizontal opening being provided with a central recess so as to conform with the outline of the upper edge of said opening.

2. In a light projector adapted to be arranged in a headlight casing, a shield arranged in the opening of said casing and having an opening through which the beam of light is projected forwardly, a forwardly facing parabolic reflector arranged in said casing and spaced from said shield, illuminating means arranged in said parabolic reflector, an upper rearwardly facing reflector having the form of a segment of a paraboloid and extending forwardly from the upper peripheral edge of said forwardly facing reflector and engaging said shield adjacent the upper edge of the opening therein, a lower rearwardly facing reflector having the form of a segment of a paraboloid and extending forwardly from the lower peripheral edge of said forwardly facing reflector and engaging said shield adjacent the lower edge of the opening therein, and a horizontal supporting rim extending forwardly from said reflector sections adjacent the periphery of said forwardly facing reflector and engaging the rear face of said shield.

3. In a light projector adapted to be arranged in a headlight casing, a shield arranged in the opening of said casing and having an opening through which the beam of light is projected forwardly, a forwardly facing parabolic reflector arranged in said casing and spaced from said shield, illuminating means arranged in said parabolic reflector, an upper rearwardly facing reflector having the form of a segment of a paraboloid and extending forwardly from the upper peripheral edge of said forwardly facing reflector and engaging said shield adjacent the upper edge of the opening therein, a lower rearwardly facing reflector having the form of a segment of a paraboloid and extending forwardly from the lower peripheral edge of said forwardly facing reflector and engaging said shield adjacent the lower edge of the opening therein, a horizontal supporting rim extending forwardly from said reflector sections adjacent the periphery of said forwardly facing reflector and engaging the rear face of said shield, and horizontal shelves extending forwardly from the inner edges of said rearwardly facing reflectors and engaging said shield and engaging said supporting rim at their outer edges.

4. In a light projector adapted for use in a headlight casing, including a forwardly facing parabolic reflector, an electric lamp arranged in said reflector, and a shield arranged in the opening of said casing, said shield having an opening in its lower part, said opening extending transversely across said shield and being of substantially uniform height, the ends of said opening being elevated relative to its central part thereby to intercept the rays from said lamp projected directly forward from said lamp, but permitting their passage laterally through the sides of said opening.

In testimony whereof I affix my signature.

JAMES E. SHERMAN.